(12) United States Patent
Woo

(10) Patent No.: US 12,254,394 B2
(45) Date of Patent: *Mar. 18, 2025

(54) SCHEDULING NEURAL NETWORK PROCESSING

(71) Applicant: Google LLC, Mountain View, CA (US)

(72) Inventor: Dong Hyuk Woo, San Jose, CA (US)

(73) Assignee: Google LLC, Mountain View, CA (US)

( * ) Notice: Subject to any disclaimer, the term of this patent is extended or adjusted under 35 U.S.C. 154(b) by 415 days.

This patent is subject to a terminal disclaimer.

(21) Appl. No.: 17/509,522

(22) Filed: Oct. 25, 2021

(65) Prior Publication Data

US 2022/0156557 A1    May 19, 2022

Related U.S. Application Data

(63) Continuation of application No. 16/017,052, filed on Jun. 25, 2018, now Pat. No. 11,157,794, which is a
(Continued)

(51) Int. Cl.
*G06N 3/042* (2023.01)
*G06F 9/48* (2006.01)
(Continued)

(52) U.S. Cl.
CPC ........... *G06N 3/042* (2023.01); *G06F 9/4881* (2013.01); *G06F 9/5016* (2013.01); *G06N 3/08* (2013.01);
(Continued)

(58) Field of Classification Search
None
See application file for complete search history.

(56) References Cited

U.S. PATENT DOCUMENTS

| 7,089,185 B2 | 8/2006 | Nefian |
| 7,171,043 B2 | 1/2007 | Nefian |

(Continued)

FOREIGN PATENT DOCUMENTS

| CN | 107454965 A | 12/2017 |
| EP | 3104309 | 12/2016 |

(Continued)

OTHER PUBLICATIONS

Yan, Feng, Olatunji Ruwase, Yuxiong He, and Evgenia Smirni. "SERF: Efficient scheduling for fast deep neural network serving via judicious parallelism." In SC'16: Proceedings of the International Conference for High Performance Computing, Networking, Storage and Analysis, pp. 300-311. IEEE, 2016. (Year: 2016).*

(Continued)

*Primary Examiner* — Vincent Gonzales
(74) *Attorney, Agent, or Firm* — Fish & Richardson P.C.

(57) ABSTRACT

A computer-implemented method includes receiving a batch of neural network inputs to be processed using a neural network on a hardware circuit. The neural network has multiple layers arranged in a directed graph and each layer has a respective set of parameters. The method includes determining a partitioning of the neural network layers into a sequence of superlayers. Each superlayer is a partition of the directed graph that includes one or more layers. The method includes processing the batch of inputs using the hardware circuit, which includes, for each superlayer in the sequence: i) loading the respective set of parameters for the layers in the superlayer into memory of the hardware circuit, and ii) for each input in the batch, processing the input through each of the layers in the superlayer using the parameters in the memory of the hardware circuit to generate a superlayer output for the input.

20 Claims, 6 Drawing Sheets

Related U.S. Application Data continuation of application No. 15/599,559, filed on May 19, 2017, now Pat. No. 10,019,668.

(51) Int. Cl.
| | | |
|---|---|---|
| *G06F 9/50* | (2006.01) | |
| *G06N 3/063* | (2023.01) | |
| *G06N 3/08* | (2023.01) | |
| *G06N 3/10* | (2006.01) | |
| *G06Q 10/06* | (2023.01) | |

(52) U.S. Cl.
CPC ............... *G06N 3/10* (2013.01); *G06N 3/063* (2013.01); *G06Q 10/06* (2013.01)

(56) References Cited

U.S. PATENT DOCUMENTS

| | | | |
|---|---|---|---|
| 7,444,282 | B2 | 10/2008 | Choo et al. |
| 7,639,727 | B1 | 12/2009 | Brisebois et al. |
| 8,462,018 | B1 | 6/2013 | Shepherd et al. |
| 9,582,726 | B2 | 2/2017 | Pan |
| 9,697,463 | B2 | 7/2017 | Ross |
| 2004/0131259 | A1 | 7/2004 | Nefian |
| 2013/0073484 | A1 | 3/2013 | Izhikevich |
| 2013/0198121 | A1 | 8/2013 | Modha |
| 2016/0026912 | A1 | 1/2016 | Falcon |
| 2016/0179434 | A1 | 6/2016 | Herrero Abellanas |
| 2016/0335119 | A1 | 11/2016 | Merrill et al. |
| 2016/0364644 | A1 | 12/2016 | Brothers et al. |
| 2016/0379073 | A1 | 12/2016 | Pan et al. |
| 2016/0379108 | A1 | 12/2016 | Chung et al. |
| 2017/0103316 | A1 | 4/2017 | Ross et al. |
| 2017/0154262 | A1 | 6/2017 | Sussillo |
| 2017/0193368 | A1 | 7/2017 | Le Grand |
| 2017/0344882 | A1 | 11/2017 | Ambrose et al. |
| 2017/0357891 | A1 | 12/2017 | Judd |
| 2019/0080233 | A1* | 3/2019 | Procter .................. G06N 3/045 |

FOREIGN PATENT DOCUMENTS

| | | |
|---|---|---|
| JP | 2017-501514 | 1/2017 |
| TW | 201232429 A | 8/2012 |
| TW | 201525742 | 7/2015 |
| TW | 201701199 A | 1/2017 |
| TW | 201714078 A | 4/2017 |
| WO | WO 2016186801 A1 | 11/2016 |
| WO | WO 2016186823 A1 | 11/2016 |
| WO | WO 2017/075346 | 5/2017 |

OTHER PUBLICATIONS

'muon.wordpress.com' [online] "Neural Networks for Triggering," Collider Blog, Oct. 12, 2014 [retrieved on May 17, 2017] Retrieved from Internet: URL<https://muon.wordpress.com/2014/10/12/neural-networks-for-triggering> 3 pages.

'visualstudiomagazine.com' [online] "Understanding Neural Network Batch Training: A Tutorial," Visual Studio Magazine, Aug. 18, 2014, [retrieved Mar. 2, 2017] Retrieved from Internet: URL<https://visualstudiomagazine.com/articles/2014/08/01/batch-training.aspx> 8 pages.

Abadi et al. "TensorFlow: A system for large-scale machine learning," Cornell University Library, arXiv, May 27, 2016, 18 pages.

Alwani et al, Fused-Layer CNN Accelerators (Year: 2016).

Dean et al. "Large Scale distributed deep networks," The 26$^{th}$ annual conference on Neural Information Processing Systems, Dec. 2012, 11 pages.

Han et al, CNN-MERP: An FPGA-Based Memory-Efficient Reconfigurable Processor for Forward and Backward Propagation of Convolutional Neural Networks, 2016.

IN Office Action in Indian Application No. 201947035713, dated Mar. 30, 2021, 7 pages (with English translation).

International Search Report and Written Opinion issued in International Application No. PCT/US2018/013939, mailed on Apr. 20, 2018, 16 pages.

JP Office Action in Japanese Application No. 2019-552217, dated Jul. 27, 2021, 7 pages (with English translation).

KR Office Action in Korean Application No. 10-2019-7027653, dated Feb. 5, 2021, 12 pages (with English translation).

Laich et al. "Graph Partitioning and Scheduling for Distributed Dataflow Computation," University of Stuttgart, 38 D-70569, Sep. 14, 2016, 72 pages.

PCT International Preliminary Report on Patentability in International Application No. PCT/US2018/013939, dated Nov. 19, 2019, 9 pages.

Rosenbrock. "Calculation of Optical Absorption Spectra Using A Supervised Neural Network," Submitted to Brigham Young University in partial fulfillment of graduation requirement for University Honors, Department of Physics and Astronomy, Brigham Young University, Apr. 2013, 95 pages.

TW Office Action in Taiwan Application No. 108119004, dated Oct. 17, 2019, 45 pages (with English translation).

TW Office Action issued in Taiwanese Application No. 107104603, mailed on Jan. 17, 2019, 15 pages (with English translation).

Velickovic et al. "X-CNN: Cross-modal Convolutional Neural Networks for Sparse Datasets," arXiv preprint arXiv1610.00163v2, Oct. 17, 2016, 8 pages.

Xiao et al. "Tux 2: Distributed Graph Computation for Machine Learning," Proceedings of the 14$^{th}$ USENIX Symposium on Networked System Design and Implementation, Mar. 27, 2017, 14 pages.

Yankov et al, Disk aware discord discovery: finding unusual time series in terabyte sized datasets, 2008.

Office Action in Chinese Appln. No. 201880019345.8, dated Dec. 1, 2022, 27 pages (with English Translation).

Office Action in European Appln. No. 18703134.9, dated Jul. 5, 2022, 7 pages.

* cited by examiner

SCHEDULING NEURAL NETWORK PROCESSING

CROSS-REFERENCE TO RELATED APPLICATION

This application is a continuation of U.S. application Ser. No. 16/017,052, filed Jun. 25, 2018, which is a continuation of U.S. application Ser. No. 15/599,559, filed May 19, 2017, the contents of which are incorporated by reference herein.

BACKGROUND

This specification relates to memory management processes for performing neural network computations.

Neural networks are machine learning models that employ one or more layers of operations to generate an output, e.g., a classification, for a received input. Some neural networks include one or more hidden layers in addition to an output layer. The output of each hidden layer is used as input to the next layer in the network, i.e., the next hidden layer or the output layer of the network. Some or all of the layers of the network generate an output from a received input in accordance with current values of a respective set of parameters.

Some neural networks include one or more convolutional neural network layers. Each convolutional neural network layer has an associated set of kernels. Each kernel includes values established by a neural network model created by a user. In some implementations, kernels identify particular image contours, shapes, or colors. Kernels can be represented as a matrix structure of weight inputs. Each convolutional layer can also process a set of activation inputs. The set of activation inputs can also be represented as a matrix structure.

SUMMARY

The subject matter described in this specification includes systems and methods for receiving a batch of neural network inputs to be processed using a neural network on a hardware circuit. The neural network can include multiple layers arranged in a directed graph and each layer can have a respective set of parameters. Methods according to the described technologies include determining a partitioning of the neural network layers into a sequence of superlayers. Each superlayer can be a partition of the directed graph that includes one or more layers.

Described methods can include processing the batch of inputs using the hardware circuit. For example, processing the batch of inputs can include loading, into a memory of the hardware circuit, the respective set of parameters for the layers in each superlayer of the sequence. Additionally, for each input in the batch, the described methods can include processing the input through each of the layers in the superlayer using the parameters in the memory of the hardware circuit to generate a superlayer output based on the input.

One aspect of the subject matter described in this specification can be embodied in a computer-implemented method. The method includes, receiving a batch of neural network inputs to be processed using a neural network on a hardware circuit, the neural network having a plurality of layers arranged in a directed graph, each layer having a respective set of parameters; and determining a partitioning of the neural network layers into a sequence of superlayers, each superlayer being a partition of the directed graph that includes one or more layers.

The method further includes processing the batch of neural network inputs using the hardware circuit, including, for each superlayer in the sequence: loading the respective set of parameters for the layers in the superlayer into memory of the hardware circuit; and for each neural network input in the batch: processing a superlayer input corresponding to the neural network input through each of the layers in the superlayer using the parameters in the memory of the hardware circuit to generate a superlayer output for the neural network input.

These and other implementations can each optionally include one or more of the following features. For example, in some implementations, for a first superlayer in the sequence, the superlayer input corresponding to the neural network input is the neural network input. In some implementations, the superlayer input to each superlayer after the first superlayer output is a superlayer output generated by a preceding superlayer in the sequence.

In some implementations, processing the batch of neural network inputs using the hardware circuit, comprises, for each superlayer: sequentially processing the superlayer inputs corresponding to the batch of neural network inputs through each of the layers in the superlayer such that the superlayer input for a first neural network input in the batch is processed through each of the layers in the superlayer before a superlayer input corresponding to a second neural network input in the batch is subsequently processed through each of the layers in the superlayer.

In some implementations, respective layers of a superlayer are associated with a working set, each working set being defined at least by: i) one or more inputs of the batch of neural network inputs to be processed using the neural network on the hardware circuit, or one or more outputs of a preceding layer of the superlayer; and ii) a size parameter that indicates an amount of memory needed to process the one or more inputs through each of the layers in the superlayer.

In some implementations, determining the partitioning of the neural network layers into a sequence of superlayers, includes: i) determining a particular size parameter for at least one working set; ii) determining a particular aggregate parameter capacity of the memory of the hardware circuit; and iii) determining the partitioning of the neural network layers into a sequence of superlayers based on at least one of the particular size parameter for the at least one working set or particular aggregate parameter capacity of the memory of the hardware circuit.

In some implementations, the memory of the hardware circuit has a threshold storage capacity, and determining the partitioning of the neural network layers into a sequence of superlayers, includes: partitioning the neural network layers into a sequence of superlayers based on the threshold storage capacity of the memory of the hardware circuit.

In some implementations, the neural network layers are partitioned into a sequence of superlayers so as to not exceed the threshold storage capacity of the memory when the hardware circuit processes the batch of neural network inputs.

In some implementations, the batch of neural network inputs and the respective set of parameters are received from a source external to the hardware circuit, and wherein processing the superlayer inputs corresponding to the neural network inputs through each layer of the superlayer comprises processing the superlayer inputs without receiving any additional parameters from the external source.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments to realize one or more of the following advantages. By partitioning neural network layers into a sequence of superlayers, external communications by a neural network hardware circuit may be minimized when the neural network processes an input using sets of parameters. Minimized external communications by the hardware circuit during computational processes can result in improved bandwidth consumption and energy optimization by the hardware circuit.

Further, a sequence of superlayers can provide a global scheduling process that intermixes "batch" and "layer" dimensions of a neural network model to optimize one or more memory working sets for the processing of inputs through neural network layers. For example, by performing global scheduling over batch and layer dimensions, live memory working sets of neural network applications may be minimized thereby enhancing batchless execution of inputs for a given hardware circuit.

Additionally, an example hardware circuit can include on-chip memory (e.g., SRAM) such that inputs and parameters of minimized working sets can be stored on-chip using the SRAM capacity. Thus, cost savings can be realized if additional memory resources are no longer required to store inputs and parameters when SRAM capacity is efficiently utilized based on a global scheduling process that provides sequences of superlayers. In some implementations, on-chip SRAM capacity may be scaled up or down as needed to meet particular design requirements and to provide scheduling processes that may, or may not, include forming superlayer sequences.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
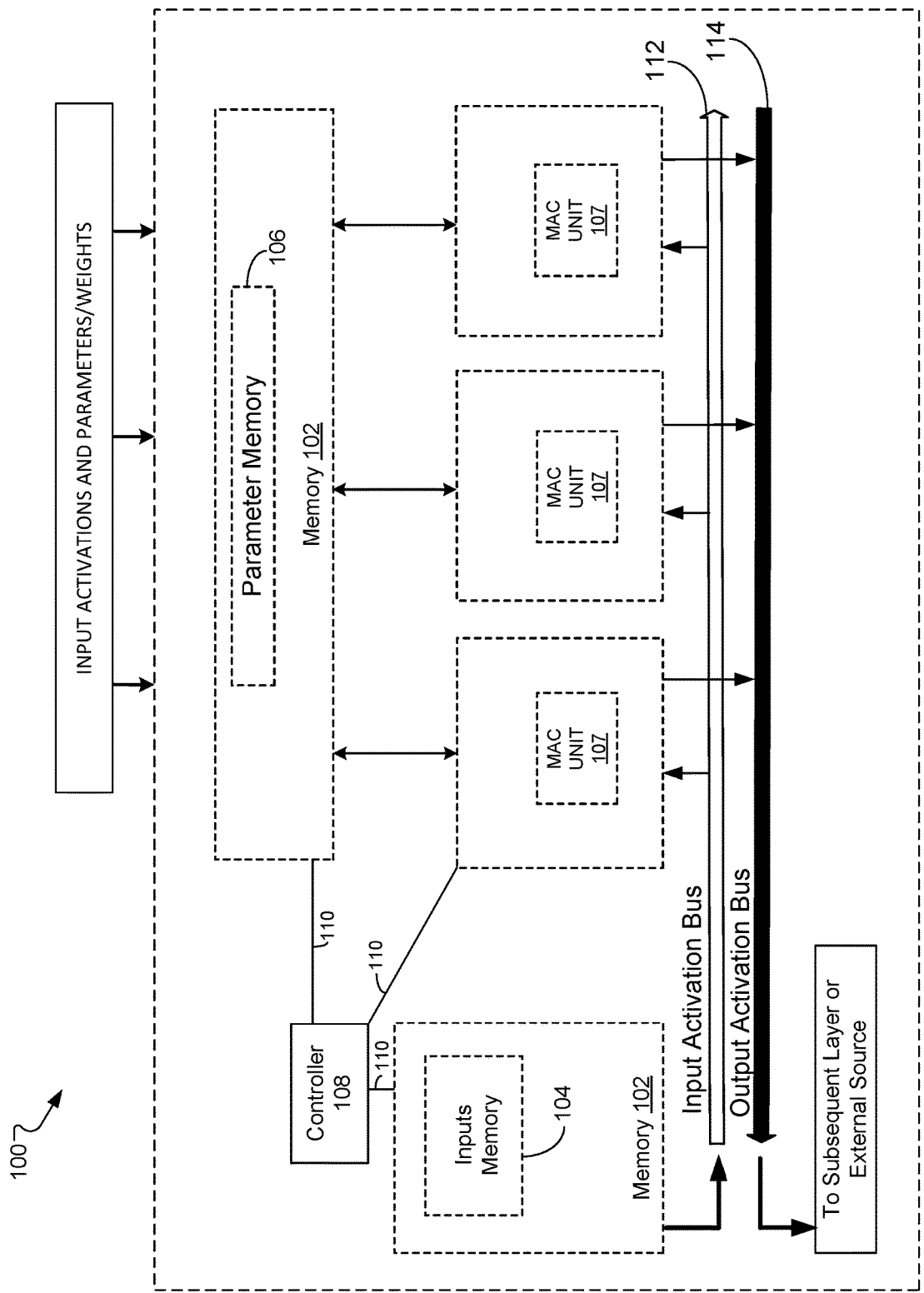
FIG. 1 illustrates an example hardware circuit for processing neural network inputs through layers of a neural network that each have a respective set of parameters.

A neural network having multiple layers can be used to compute inferences. For example, given an input, the neural network can compute an inference for the input. The neural network computes this inference by processing the input through each of the layers of the neural network. In particular, the layers of the neural network can be arranged in a directed graph, with some or all of the layers having a respective set of parameters. Each layer receives an input and processes the input in accordance with the set of parameters for the layer to generate an output. The output can be used as an input at the next neural network layer.

Therefore, in order to compute an inference from a received input, the neural network receives the input and processes it through each of the neural network layers in the directed graph to generate the inference, with the output from one neural network layer being provided as input to the next neural network layer. Data inputs to a neural network layer, e.g., either the input to the neural network or the outputs of one or more layers connected to the layer in the directed graph, to a neural network layer can be referred to as activation inputs to the layer.

Any particular layer in the directed graph can receive multiple inputs, generate multiple outputs, or both. The layers of the neural network can also be arranged such that an output of a layer can be sent back as an input to a previous layer. Methods according to the described technologies can include determining a partitioning of the neural network layers into a sequence of superlayers such that each superlayer is a partition of the directed graph that includes one or more layers.

Described methods can include processing the batch of inputs through layers of respective superlayers in the sequence for a neural network on a hardware circuit. Processing the batch of inputs can include loading parameters for the layers into a memory of the hardware circuit, and using the parameters to process a neural network input to generate respective superlayer outputs for the input.

In some implementations, one or more functions described in this specification can be performed using a hardware circuit or electronic component of a system. The hardware circuit can receive control signals from a control device that is electrically coupled to the hardware circuit. The hardware circuit can be a packaged electronic device that includes one or more non-transitory machine-readable storage mediums (e.g., memory) for storing inputs to a neural network layer and parameters used to process the inputs.

The hardware circuit can include multiple components that form a packaged integrated circuit or processor device such as a processor micro-chip (e.g., a CPU or GPU). Hence, in this instance, the memory of the hardware circuit can be "on chip" memory relative to the multiple other components that form the micro-chip. As used in this specification, a packaged hardware circuit or electronic device may include semiconducting material, such as a silicon wafer, that is encapsulated or enclosed within a supporting case. The supporting case can include one conductors wires that extend from a periphery of the case for connecting the device to a printed circuit board.

The control device can be an external controller that is spaced apart from the hardware circuit and that is external to at least the on-chip memory enclosed by the component package (e.g., the supporting case) of the hardware circuit. The external controller can be a system-level controller that provides control signals to the hardware circuit to cause the hardware circuit to perform neural network inference computations using the inputs and parameters discussed above. The external controller can include "off-chip" memory, where the memory is off chip at least because the memory is not co-located with the on-chip memory of the packaged hardware circuit.

In some implementations, when performing inference computations, rather than using the off-chip memory, the external controller can use the on-chip memory of the hardware circuit to store inputs and parameters. In response to receiving controls signals from at least one controller of the system, the hardware circuit accesses the on-chip memory and uses the stored inputs and parameters to perform neural network computations.

FIG. 1 shows an example of a hardware circuit 100 that can be used to perform neural network computations. Performing neural network computations can include circuit 100 processing neural network inputs through layers of a neural network that each have a respective set of parameters. In some implementations, circuit 100 corresponds to a hardware circuit that includes one or more processors, processor microchips, or other circuit components that embody a neural network. In other implementations, circuit 100 can include one or more hardware circuits, processors and other related circuit components that form one or more neural networks. In general, methods according to the described technologies can be applied to, or can be implemented using, a variety of processor architectures, such as, CPUs, GPUs, digital signal processors (DSPs), or other related processor architectures.

Circuit 100 generally includes a controller 108 that provides one or more control signals 110 to cause inputs associated with memory 104 to be either stored to, or retrieved from, a memory address of memory 102. Likewise, controller 108 also provides one or more control signals 110 to cause parameters for parameter memory 106 to be either stored to, or retrieved from, a memory address of memory 102.

Circuit 100 further includes one or more multiply accumulate (MAC) cell/unit(s) 107, an input activation bus 112 and an output activation bus 114. Control signals 110 can, for example, cause memory 102 to provide one or more inputs unto input activation bus 112, cause memory 102 to provide one or more parameters from parameter memory 106, and/or cause MAC cell/unit 107 to use the inputs and parameters to perform computations that produce output activations that are provided to output activation bus 114.

Controller 108 can include one or more processing units and memory. Processing units of controller 108 can include one or more processors (e.g., microprocessors or central processing units (CPUs)), graphics processing units (GPUs), application specific integrated circuits (ASICs), or a combination of different processors. Controller 108 can also include other storage or computing resources/devices (e.g., buffers, registers, control circuitry, etc.) that provide additional processing options for performing one or more of the determinations and calculations described in this specification.

In some implementations, processing unit(s) of controller 108 executes instructions stored in memory to cause controller 108 and circuit 100 to perform one or more functions described in this specification. The memory of controller 108 can include one or more non-transitory machine-readable storage mediums. Non-transitory machine-readable storage mediums described herein can include a solid-state memory, a magnetic disk, an optical disk, a portable computer diskette, a random access memory (RAM), a read-only memory (ROM), an erasable programmable read-only memory (e.g., EPROM, EEPROM, or Flash memory), or any other tangible medium capable of storing information.

Circuit 100 can be an example compute unit or compute tile and can include additional hardware structures to perform computations associated with multi-dimensional data structures such as tensors, matrices and/or data arrays. In some implementations, input values can be pre-loaded to activation memory 104 and parameter/weight values can be pre-loaded to parameter memory 106 using data values received by circuit 100 from an external or higher level control device associated with a neural network computing system.

Circuit 100 can receive instructions that define a particular compute operation to be performed by using a neural network of the system. In general, data values stored in memory 102 are typically each written to a respective memory address location. The address location in memory 102 can then be accessed by an example control device (e.g., controller 108) when a data value such as an input is needed to perform a particular compute operation.

Controller 108 can provide one or more control signals 110 to memory 102 to load inputs, from memory 102, onto input activation bus 112 and provide the values to an array of computational units that include MAC 107. An index of activation memory 104 can include all memory address locations having inputs. Data bus 112 is accessible by one or more units of a computational array. The units of the computational array can receive, from data bus 112, one or more activation values to perform computations relating to matrix multiplication based on the received activation values.

For a given compute cycle, circuit 100 can require access to an element of activation memory 104 and parameter memory 106 to execute multiplication operations associated with inference computations for a neural network layer. For a cycle in which computations are performed, controller 108 can provide one input value at a time and the array of computational units including MAC cell 107 will multiply an activation with a weight/parameter to produce different output activations for a given input.

In some implementations, each MAC cell 107 of the array of computational units can be responsible for different output depths of a neural network layer. The array of computational units can be fully controlled by controller 108, and controller 108 can determine, based on detection of an activation value, when there is a need to perform a particular computation.

Furthermore, input values can be analyzed upon arriving at circuit 100 for storage in memory 102. In response to analyzing the inputs, controller 108 can execute programmed instructions to efficiently compress activation data by storing only particular input values in memory 102 (e.g., only non-zero activation values), thereby saving memory storage space and corresponding bandwidth.

When circuit 100 receives inputs and parameters, controller 108 can, for example, execute one or more direct memory access operations. Execution of these memory access operations includes storing, in address locations of memory 102, inputs corresponding to dimensional elements of activation memory 104. Likewise, controller 108 can also store, in address locations of memory 102, parameters corresponding to dimensional elements of parameter memory 106. Controller 108 can further include one or more address registers that maintain the memory addresses from which a particular input will be fetched. Moreover, the one or more registers will also store the memory addresses from which a corresponding parameter is fetched to be multiplied with the particular input.

Controller 108 can reference the above mentioned registers to determine a corresponding parameter (and memory address) for a first input and to determine a corresponding parameter (and memory address) for a second input when the first and second inputs are processed sequentially. In some implementations, output activations computed at a first neural network layer are used as inputs to a next/subsequent second layer in the network, e.g., a next hidden layer or the output layer of the network. In general, each layer of the neural network generates an output from a received input in accordance with current values of a respective set of parameters.

In alternative implementations, there may be some compute operations in which a single input is used as an operand for several multiply operations covering a variety of weights for a given dimensional element of parameter memory 106 (e.g., to iterate an "X" or "Y" dimension). According to the described technologies, circuit 100 can be configured to receive controls signals from an external controller of a computing system or machine learning system. The external controller can provide batches of neural network inputs and parameters that are stored in the an on-chip memory of circuit 100. As described in more detail below, the external controller can be configured to implement a scheduling policy for batch element processing by a neural network on circuit 100.

For example, an external controller of the system can provide control signals to circuit 100 to cause circuit 100 to process neural network inputs through layers of the neural network using inputs and parameters that are stored in on-chip memory of circuit 100. According to the described technologies, a particular scheduling policy can be used to partition layers of the neural network into groupings of layers that form one or more sequences of superlayers (described below). The system controller can then use circuit 100 to access inputs and parameters stored in on-chip memory and then process batches of neural network inputs through each layer in a sequence of superlayers.

Figure 2A:
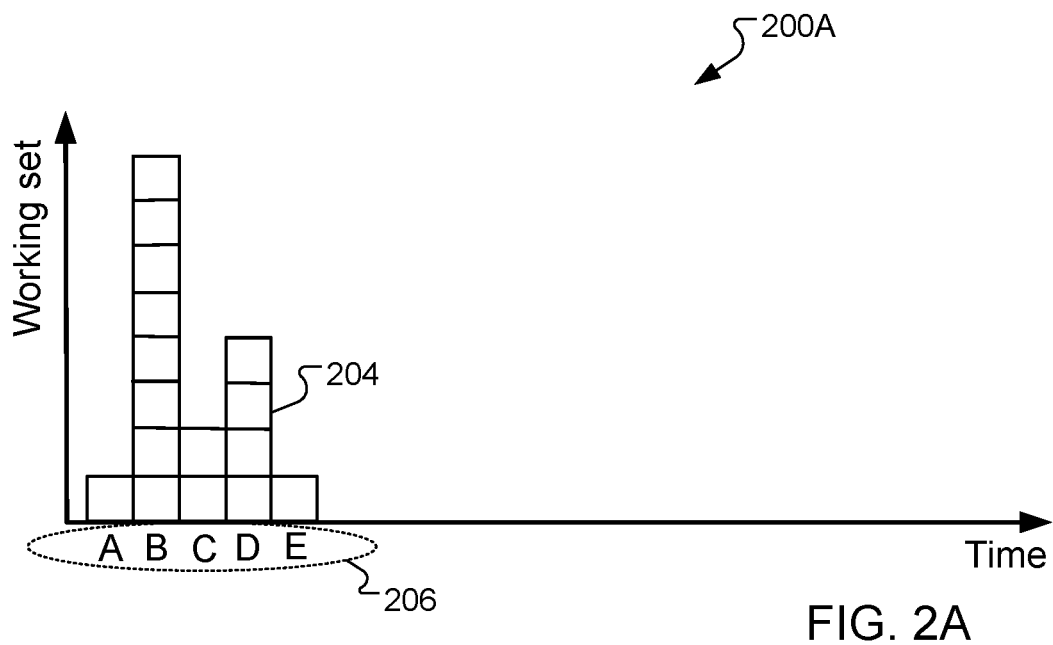
FIG. 2A illustrates an example graph that relates to processing of a single batch element using respective layers of a neural network.

FIG. 2A illustrates an example graph 200A that relates to processing of a single batch element using respective layers of a neural network. Graph 200A shows how the size of a working set varies during the processing of the batch element through the layers of the neural network. The size of the working set is represented in terms of storage units 204. Generally, a working set for a given neural network layer includes inputs to the neural network layer, outputs from the neural network layer, and the parameters that are used to process the inputs by the neural network layer. Working sets generally include a grouping of one or more data structures that are needed for a given neural network computation and are described in more detail below.

One or more storage units 204 are used to store inputs of a working set and associated parameters for a neural network layer. Storage units 204 can be associated with memory resources of memory 102 described above. A batch element is to a single neural network input that is processed using an example neural network on a hardware circuit.

As noted above, a neural network can include multiple layers that are used to compute inferences, and an inference is computed by processing a neural network input through the layers of the neural network. Thus, graph 200A further shows neural network layers 206, including layer A, layer B, layer C, layer D and layer E. Graph 200A shows that a batch element is first processed through layer A, then through layer B, then through layer C, then through layer D, and then through layer E. In some implementations, respective layers of layers 206 can be one of the following types of neural network layers: a convolutional layer, a reduction layer, a fully connected (FC) layer, a classifier layer, an element-wise multiply layer, or a pooling layer, e.g., average pooling layer or max pooling layer.

A working set for a neural network layer can include one or more batch elements and parameters that are used to process the batch elements through respective layers of the neural network. A working set can be defined by: i) one or more inputs/batch elements of a batch of inputs that are to be processed using the neural network on the hardware circuit; and ii) a size parameter or number of storage units 204 that indicates an amount of memory needed to store the inputs and parameters. In addition to inputs, a working set may also include output activations. In some implementations, a neural network can be described as having a "batch" dimension that is associated with the batch elements described above, and a "layer" dimension corresponding to layers 206.

In general, the following description of FIG. 2A provides context for the improved neural network scheduling processes described herein below with reference to, for example, FIGS. 3-6. For example, layers 206 can be neural network layers of an example machine learning model that includes at least five layers (e.g., layers A, B, C, D, and E). Inference computations performed by the machine learning model may experience sudden or unexpected increases in feature depth or output striding. When this occurs, an active working set at a given point in a neural network compute process, may increase input and output activation quantities or decrease input and output activation quantities over time.

For example, as shown in FIG. 2A, a working set of a single batch element processed by a machine learning model may require a single storage unit 204 for batch processing that occurs at layer A. An increase in input activations processed for a given working set may occur during batch processing at layer B. Thus, the machine learning model can require use of 8 storage units 204 during batch processing at layer B rather than the single storage unit 204 at layer A. Further, in the implementation of FIG. 2A, working sets processed at layers C, D, and E may require 2, 4, and 1 units of storage respectively.

In some implementations, increases or decreases in input/output activation quantity and corresponding required storage units can occur based on layers of a neural network each having different numbers of parameters or weights. So, a working set for layer A can include fewer activations and parameters relative to layer B, and so the working set for layer A may only require fewer storage resources relative to a larger working set for layer B that may require more storage resources.

In some implementations, storage units 204 can correspond to memory resources of inputs memory 104 and parameter memory 106. For example, storage units 204 can correspond to memory resources of a static random access memory (SRAM) that is associated with on-chip memory of the above described electronic component of a hardware circuit of circuit 100. On-chip memory resources that include memory 104, 106 can have a fixed or threshold storage capacity. This threshold storage capacity may be less than, or substantially less than, a storage capacity of a dynamic random access memory (DRAM) resource that is associated with off-chip memory of circuit 100. As indicated above, the off-chip memory can be memory of a higher level external control device.

Figure 2B:
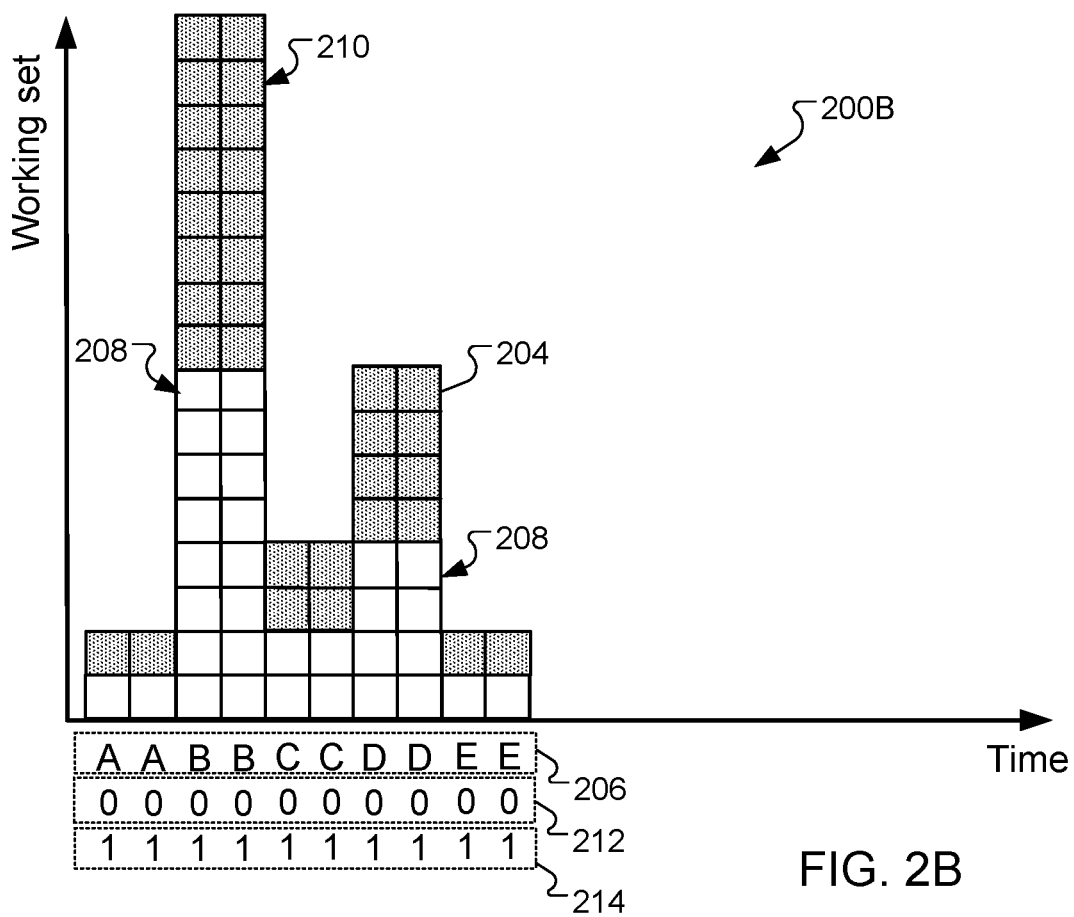
FIG. 2B illustrates an example graph that relates to processing of multiple batch elements for a given layer of a neural network.

FIG. 2B illustrates an example graph 200B that relates to processing of multiple batch elements for a given layer of a neural network. Graph 200B includes a first collection of storage units 208 for storing inputs of working sets associated with respective batch elements of batch 212. Graph 200B further includes a second collection of storage units 210 for storing inputs of working sets associated with respective batch elements of batch 214.

In the implementation of FIG. 2B, two or more batches can each include multiple batch elements, namely batch 212 can have at least one individual batch element "0," and batch 214 can have at least one individual batch element "1." Processing of at least two batches 212, 214 can cause a relative size of a given working set to be amplified by a factor of the batch size. For example, as shown in FIG. 2B, the working set size at each of layers 206 (layer A-layer E) can be amplified, e.g., doubled, based on processing inputs of at least two batches, batch 212 and batch 214, that have corresponding batch sizes.

As discussed above, a system controller can be configured to include compile-time scheduling, or other computing logic, for implementing a neural network scheduling process or policy that defines the manner in which batches of inputs are processed through one or more layers of a neural network. For example, circuit 100 receives a batch of neural network inputs and the system controller determines a scheduling process for how the inputs should be processed to perform an inference for each input in the batch. Processing of the inputs causes the neural network to generate intermediate inputs such as input activations that can be provided to a subsequent layer of the neural network. Intermediate inputs can correspond to output activations of a first neural network layer that are provided as input activations to a subsequent neural network layer.

In a conventional scheduling policy, a neural network processes each input or batch element in a batch through a first neural network layer to generate a layer output (output activation) for each batch element. Each layer output is then processed through a second neural network layer and so on until the processing of the batch elements in the batch are complete. That is, the processing of a given layer is performed for all batch elements in the batch before any processing for the next layer in the neural network occurs. This conventional neural network scheduling policy may be limited by constraints such as memory capacity and, thus, may be inefficient at maximizing use of available memory and computing resources of a machine learning system.

Regarding use of on-chip memory, e.g., storage units 204 of memory 104, 106, of an example hardware circuit, in some implementations, a maximum batch size that can be supported by on-chip memory resources can be determined based on a size of a working set. In particular, the maximum batch size supported by storage units 204 can be determined based, in part, on the largest working set of inputs and parameters that are processed by a given neural network layer.

For example, and with reference to FIG. 2B, a total on-chip storage capacity associated with memory 102 and 104 may be limited to 20 storage units 204. In FIG. 2B, because a working set of two batch elements processed by layer B requires 16 storage units 204, processing of a third batch element would require 24 units of storage unit 204 and, thus, exceed the 20 storage unit capacity. So, in this example, a neural network may only support a particular maximum working set size that includes two batch elements, when processing each batch element requires at least 8 units of storage.

Specifically, in the implementation of FIG. 2B, processing of batch element "0" in the working set requires 8 units of storage as indicated by reference feature 208 and processing of batch element "1" the working set also requires 8 units of storage as indicated by reference feature 210. Thus, because processing batch elements 0 and 1 collectively require 16 storage units 204, processing of at least one additional batch element that requires more than 4 storage units 204 would exceed on-chip storage capacity (limited here to 20 units) of available memory resources of a hardware circuit of a neural network.

Figure 3:
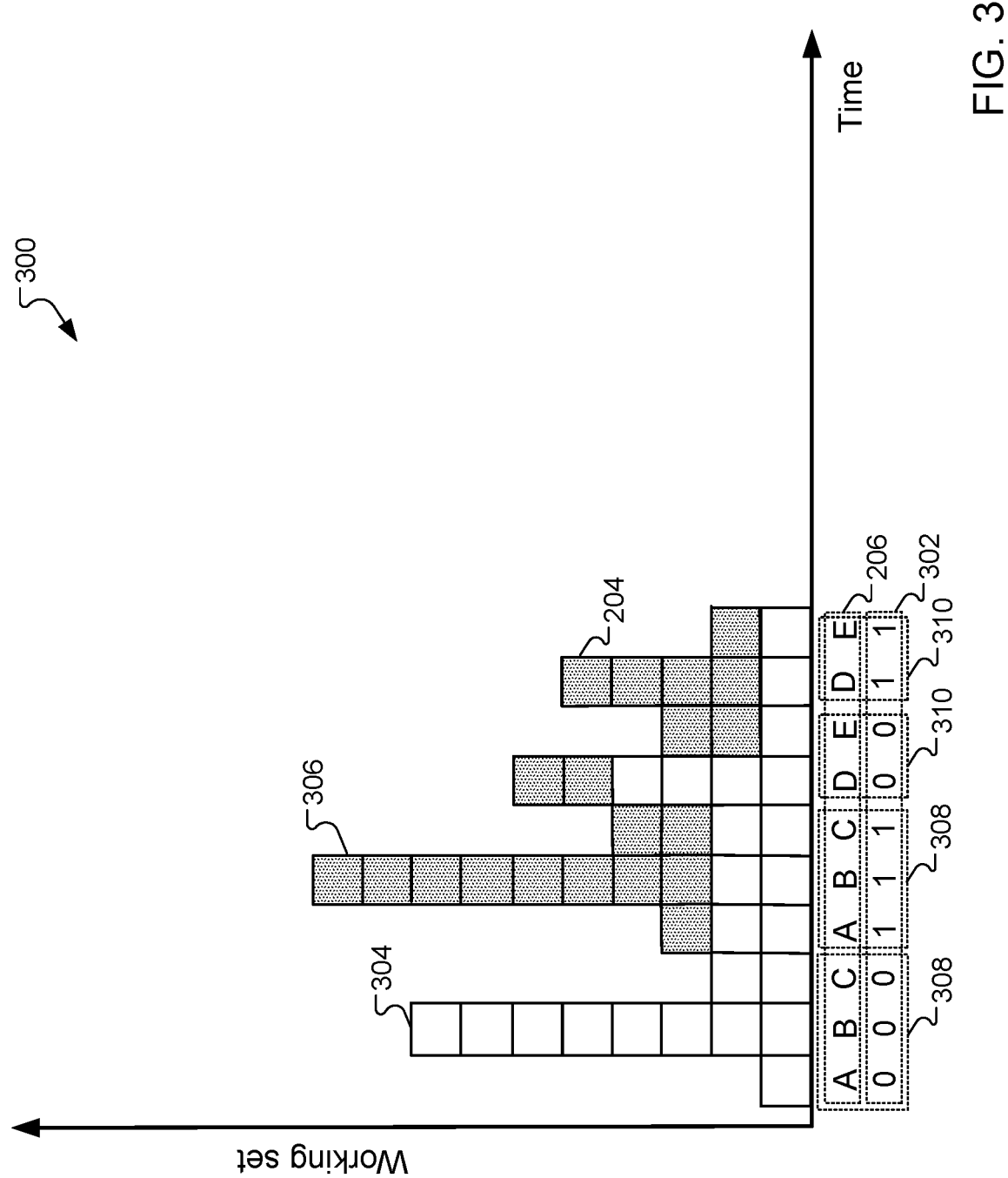
FIG. 3 illustrates an example graph that relates to processing of a single batch element among multiple layers of a neural network that form a superlayer.

FIG. 3 illustrates an example graph 300 that relates to processing of batch elements among multiple layers 206 of a neural network that form one or more superlayers. Graph 300 includes a first collection of storage units 304 for storing inputs and parameters of working sets associated with batch element 0 of respective batch elements 302. Likewise, graph 300 further includes a second collection of storage units 306 for storing inputs and parameters of working sets associated with batch element 1 of respective batch elements 302.

As indicated above, circuit 100 can include an example electronic component or hardware circuit that may have fewer on-chip or SRAM storage resources relative to other components or circuits of circuit 100. However, as described herein, circuit 100 can be configured to execute compute-intensive machine learning algorithms using available on-chip memory. In these instances, a neural network of a machine learning system can include an accelerator architecture that does not impose unnecessary constraints on a minimum or maximum batch size that can be supported by storage units 204 of the hardware circuit's on-chip memory.

According to the described technologies, an improved neural network scheduling process can be used to efficiently exploit batch locality afforded through use of local on-chip storage resources of a hardware circuit of circuit 100. Further, use of this on-chip storage as well as other local computing resources can optimize available bandwidth and conserve component energy consumption in bandwidth- and energy-sensitive computing environments. Further still, use of this on-chip storage and other local resources can serve to minimize external communications by the hardware circuit during processing of inputs through layers of a neural network.

For example, as noted briefly above, a hardware circuit that implements a neural network may communicate externally with a host device/external controller to receive neural network inputs and parameters that are used by the neural network to compute inferences. These external communications can require use of on-chip computing resources of the hardware circuit. Hence, the external communications can decrease available computing bandwidth of the hardware circuit, increase system latency, and may also cause increases in energy consumption by electronic components of the hardware circuit.

In view of these constraints relating to bandwidth and energy consumption, this specification describes a global scheduling policy or process that intermixes "batch" and "layer" dimensions of an example neural network model to optimize use of particular memory working sets. In particular, implementations of the described technologies can include a flexible neural network scheduling policy that leverages batch and layer dimensions of a machine learning model to minimize a size of active working sets for batch elements processed by the neural network.

For example, an improved neural network scheduling process according to the described teachings enable active working sets to be sized such that storage of the working sets, including parameters, in on-chip memory 104, 106 does not exceed a threshold storage capacity of the on-chip memory resource. Hence, methods described herein enable efficient scheduling of batch element processing by a neural network. For example, efficiencies can be realized based on a scheduling policy that enables working sets to be stored in on-chip storage of a hardware circuit in a manner that does not impose unnecessary constraints on a batch size of inputs and parameters used to process the inputs.

Further, an improved scheduling policy according to the described teachings can maximize efficient use of available on-chip resources for storing inputs and parameters so that external communications to access off-chip resources are minimized. Efficient use of on-chip resources and reduced external communications can lead to an increase in available system bandwidth and an overall decrease in energy consumption by system components.

In some implementations, aspects of an improved scheduling process or policy can be encoded using software instructions or program code. The instructions can be executable by at least one processor of circuit 100, at least one processor of controller 108, or at least one processor of an example hardware circuit of circuit 100 or controller 108, or both.

Figure 4:
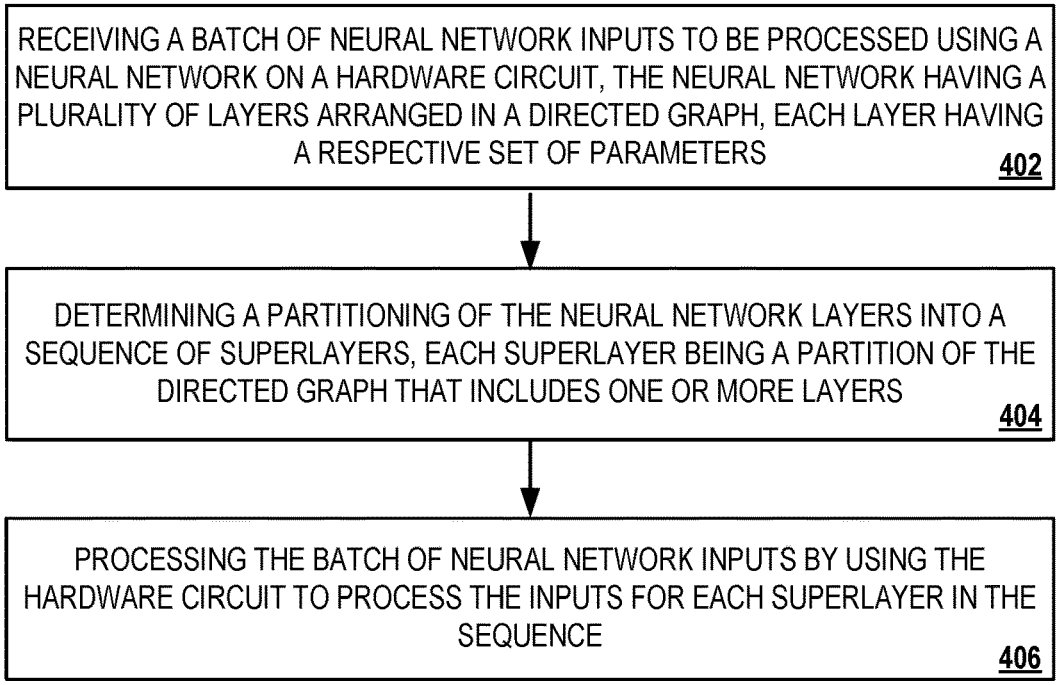
FIG. 4 is an example flow diagram for a method of processing neural network inputs through superlayers of a neural network.

FIG. 4 is an example flow diagram for a method 400 of processing neural network inputs through superlayers of a neural network using circuit 100. Method or process 400 corresponds to an improved scheduling policy for batch element processing by a neural network. At block 402, circuit 100 receives a batch of neural network inputs to be processed using a neural network on a hardware circuit of the system. The neural network can have multiple layers that are arranged in a directed graph and each layer can have a respective set of parameters. As discussed above, in some implementations, a hardware circuit of circuit 100 can receive inputs from a host interface device or higher level controller of an example neural network hardware system.

At block 404, circuit 100 determines a partitioning of the neural network layers into a sequence of superlayers. For example, circuit 100 can include, or have access to, compiler logic that is configured to determine one or more partitions of the neural network layers into sequences of superlayers. Alternatively, or in addition to the compiler logic, circuit 100 can include, or have access to, at least one hardware block configured to determine one or more partitions of the neural network layers into sequences of superlayers. In some implementations, each superlayer in the sequence of super layers is a partition of the directed graph that includes one or more layers.

At block 406, circuit 100 processes the batch of neural network inputs using the hardware circuit of the system. In some implementations, processing a batch of neural network inputs using the hardware circuit can include loading respective sets of parameters for the layers in the superlayer into memory 106. In some instances, parameters for the layers in a superlayer are loaded for each superlayer in a sequence of superlayers. Further, processing a batch of neural network inputs using the hardware circuit can also include, for each neural network input in the batch, processing the neural network input through each of the layers in the superlayer using the parameters in the memory of the hardware circuit to generate a superlayer output for the neural network input.

For a first superlayer in the sequence, the output of the neural network input to the superlayer (e.g., a superlayer input) is a first superlayer output. Additionally, the superlayer input to each superlayer after the first superlayer is a superlayer output generated by a preceding superlayer in the sequence. In some implementations, processing a batch of neural network inputs includes processing the inputs through all the layers of a first superlayer in the sequence and then processing the inputs through all layers of each subsequent superlayer in the sequence until all of inputs in the batch have been processed through all of the superlayers in the neural network.

Referring again to FIG. 3, when using an improved neural network scheduling process, one batch element can be executed in a batchless manner for multiple layers 308, 310, 312, and 314. According to the described technologies, multiple layers 308 can form a first superlayer, while multiple layers 310 can form a second superlayer that is different than the first superlayer. Groupings of multiple layers that are partitioned to form superlayers are described in more detail below with reference to FIG. 4.

As shown in FIG. 3, in some implementations, layer B of an example machine learning model can require a large amount of storage units 204 to process a large working set relative to a required amount of storage units at layer C where a smaller working set is processed. When a working set for a batch element is sufficiently small, an improved scheduling process can include a machine learning model switching to a next batch element that is processed by a particular grouping of multiple layers (e.g., a superlayer), such as superlayer/layers 308.

For example, a neural network implemented on a hardware circuit of circuit 100 can be configured to perform global scheduling over "batch" and "layer" dimensions of a neural network. In particular, batch processing of inputs to a neural network layer can be performed by executing a group of layers 308 (A, B, C) for a first batch of elements 0 in a first process iteration, and then executing the same group of layers (A, B, C) 308 for a second batch of elements 1 in a second process iteration.

As shown in FIG. 3, alternating between different batch elements in accordance with an improved scheduling policy reduces a maximum size of the working sets relative to a maximum working set size of the conventional scheduling policy described above. For example, at least with regard to batch processing at layer B for batch element 1, alternating between different batch elements can reduce a maximum working set size of layer B to 10 units, instead of the maximum working set size of 16 units required when using the conventional scheduling policy described above.

Figure 5:
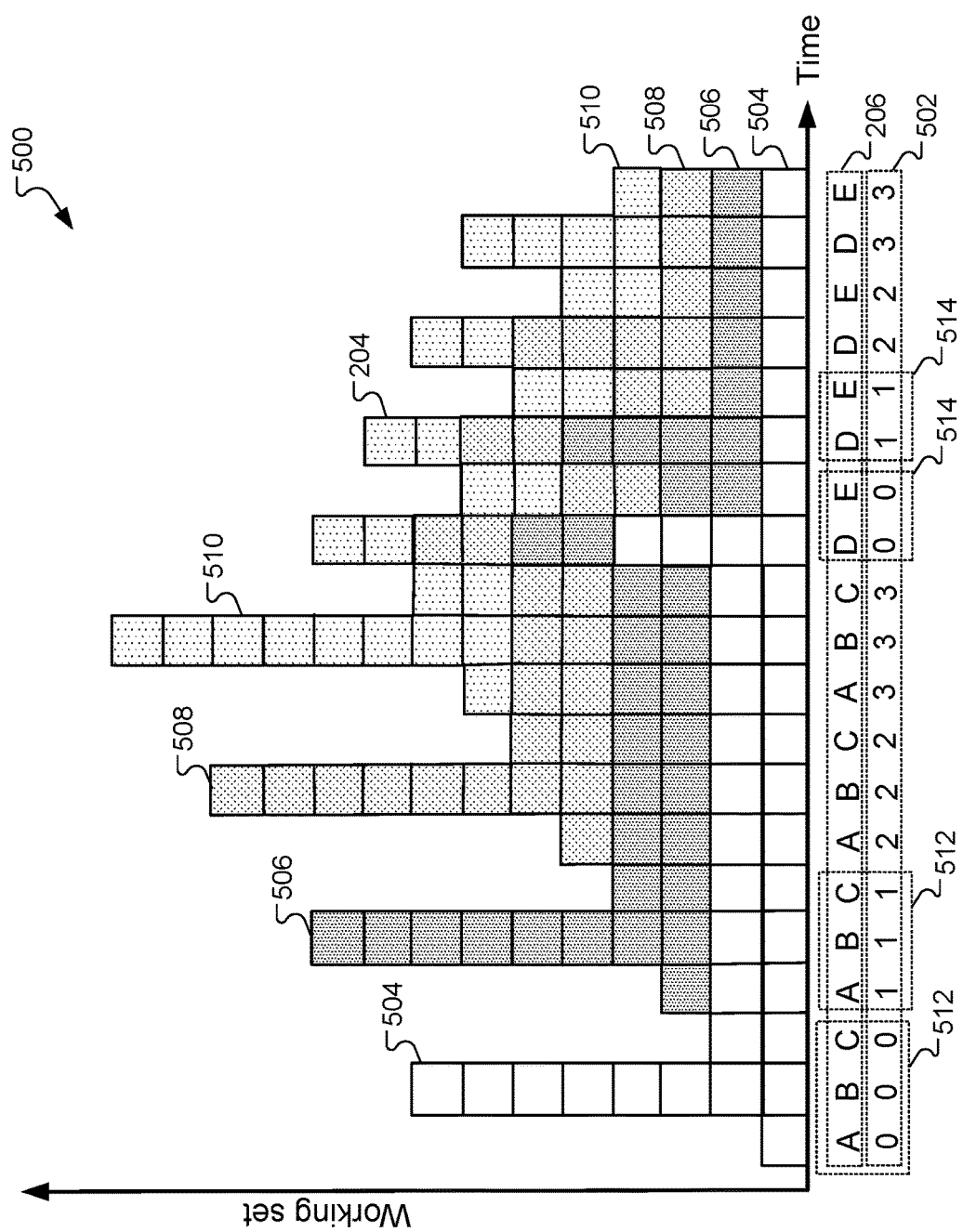
FIG. 5 illustrates an example graph that represents neural network layers that are partitioned into a sequence of superlayers for processing a single batch element using multiple layers of a superlayer.

FIG. 5 illustrates an example graph 500 that represents neural network layers that are partitioned into a sequence of superlayers for processing at least a single batch element using multiple layers that are partitioned to form superlayers. Graph 500 includes a first collection of storage units 504 for storing inputs of working sets for batch element 0 of respective batch elements 502.

Likewise, graph 500 further includes: a) a second collection of storage units 506 for storing inputs of working sets for batch element 1 of respective batch elements 502; b) a third collection of storage units 508 for storing inputs of working sets for batch element 2 of respective batch elements 502; and c) a fourth collection of storage units 510 for storing inputs of working sets for batch element 3 of respective batch elements 502.

Graph 500 further includes a sequence of superlayers along an X-axis of the graph. For example, graph 500 includes: i) a first superlayer 512 for processing batch elements 0, 1, 2, and 3 through each of layers A, B, C; and ii) a second superlayer 514 for processing batch elements 0, 1, 2, and 3 through each of layers D, E. According to the described teachings, a sequence of superlayers defined based on an improved neural network scheduling policy can support a relatively high working set batch size without exceeding on-chip memory capacity, or threshold capacity, of a hardware circuit that executes a neural network.

For example, as shown in FIG. 5, when inputs are processed during an example "B3" layer and batch phase, a maximum size of a working set can require only 14 storage units for four batch elements, e.g., batch elements 0, 1, 2, and 3 as indicated by the distinguishing shade patterns of respective storage units 204. This reduction in required storage units, as compared to the conventional scheduling process (e.g., that requires 16 storage units), allows for improved exploitation of the locality of inputs and parameters received and stored via on-chip memory of a hardware circuit. This improved leveraging of on-chip resources can result in increased bandwidth and energy savings that are realized based in part on reduced usage of off-chip, or DRAM, memory resources.

Additionally, as noted briefly above, an improved scheduling policy can be used to process one or more batches of inputs or inputs without exceeding on-chip memory capacity of a hardware circuit of circuit 100. In some implementations, processing one or more batches of neural network inputs through layers of a superlayer in a sequence can include generating, by a first superlayer (512) in the sequence, a first superlayer output for receipt by at least a subsequent layer of a neural network as an input to the subsequent layer.

In some instances, a neural network input to a second superlayer in a sequence of superlayers can correspond to a first superlayer output generated by a first superlayer in the sequence. Further, processing a batch of inputs through layers of a superlayer in a sequence can include processing a neural network input through each of the layers in the second superlayer using the parameters in a memory of a hardware circuit to generate a second superlayer output for a neural network input that corresponds to a first superlayer output.

In some implementations, processing a batch of neural network inputs through layers of a superlayer in a sequence of superlayers can include processing inputs for a batch element one-by-one through each layer of the superlayer. For example, processing a batch of inputs can include sequentially processing two or more neural network inputs through each of the layers in a superlayer. Such sequential processing can include processing a first neural network input through each layer of the superlayer and then processing a second neural network input through each layer of the superlayer.

In some implementations, for each superlayer in the sequence, processing inputs through layers of the superlayer can include, sequentially processing superlayer inputs corresponding to the batch of neural network inputs through each of the layers in the superlayer such that the superlayer input for a first neural network input in the batch is processed through each of the layers in the superlayer before a superlayer input corresponding to a second neural network input in the batch is subsequently processed through each of the layers in the superlayer.

In some implementations, a first superlayer in a sequence of superlayers can include a single neural network layer. In this implementation, processing inputs through a sequence of superlayers can include processing a first input through the first superlayer that includes the single neural network layer. After this first input is processed through the single layer of the first superlayer, a second input can be immediately processed by the first superlayer before the first input is processed through all layers of the subsequent superlayer that follows the first superlayer in the sequence. The first input that is processed by the subsequent superlayer in the sequence can be a superlayer output of the first superlayer that includes the single neural network layer.

A superlayer and one or more sequence of superlayers can be formed based on partitioning groups of layers in accordance with an improved neural network scheduling policy. In some implementations, circuit 100 includes programmed instructions for an improved scheduling policy and these instructions can include determining a partitioning of neural network layers into a sequence of superlayers. Each superlayer can be a partition of a directed graph that includes one or more layers.

Aspects of an improved scheduling process can cause neural network layers to be formed into multiple superlayers such that all inputs and parameters for a given superlayer can be accessed from on-chip storage of a hardware circuit of circuit 100. As indicated above, on-chip access to inputs and parameters can minimize external communications by the hardware circuit. For example, external communications can be minimized because the hardware circuit can avoid computing processes that are associated with recurring fetch operations to obtain additional quantities of inputs and parameters from an off-chip interface.

In some implementations, an off-chip interface can couple a hardware circuit to an external control device that provides inputs and parameters to circuit 100. In particular, each superlayer in a sequence of superlayers can receive a particular quantity of parameters for processing one or more neural network inputs for the superlayer. In some instances, processing the one or more neural network inputs through layers of the superlayer can include processing the inputs without receiving subsequent quantities of parameters to process a particular quantity of inputs for the superlayer.

In some implementations, circuit 100 executes program code to determine one or more superlayer partitions or boundaries of a sequence of superlayers. For example, circuit 100 can determine or compute a sum of an activation working set and aggregate parameter capacity for a given layer. Circuit 100 can then use the determined sum to determine a partitioning of neural network layers into a sequence of superlayers based in part on a predefined or threshold on-chip storage capacity (e.g., memory 104 and 106) of memory resources of a hardware circuit. Hence, neural network layers can be partitioned into a sequence of superlayers so as to not exceed a threshold storage capacity of on-chip memory when a hardware circuit of circuit 100 processes one or more batches of neural network inputs.

In some implementations, determining a partitioning of neural network layers into a sequence of superlayers includes: i) circuit 100 determining a particular size parameter for at least one working set that includes inputs for processing by the neural network; ii) circuit 100 determining a particular aggregate input activation and parameter capacity of a memory of a hardware circuit; and iii) circuit 100 determining the partitioning of the layers into a sequence of superlayers based on at least the particular size parameter for the at least one working set or the particular aggregate input activation and parameter capacity of the memory of the hardware circuit.

For example, a storage capacity, or threshold capacity, of on-chip memory may be 500 megabyte (MB). Circuit 100 can determine total on-chip memory usage based on an equation 1[Total usage=(working set*N)+parameters] where a variable N of equation 1 is a batch size. Circuit 100 can then determine an amount of memory required to store respective sets of parameters for each layer of a neural network. In some implementations, referencing FIG. 5, circuit 100 can determine that: i) a set of parameters for layer A requires 25 MB of memory; ii) a set of parameters for layer B requires 125 MB of memory; and iii) a set of parameters for layer C requires 50 MB of memory.

Thus, in this example, circuit 100 determines that aggregate memory usage for respective sets of parameters for layers A, B, and C is 300 MB, leaving 200 MB of available on-chip memory for use in storing inputs. For respective layers A, B, C, circuit 100 can determine a particular size parameter for inputs of working sets to be processed by respective layers and a corresponding batch size for the working set. Using the size parameter of the inputs for the working set and the corresponding batch size, circuit 100 can determine the aggregate activation and parameter capacity of the memory. Circuit 100 can use the aggregate activation and parameter capacity of the memory to determine a partitioning of layers into a sequence of superlayers.

In some implementations, circuit 100 uses equation 1, the size parameter of the inputs (e.g., in memory units), the batch size, and the aggregate memory used for the parameters to determine a total on-chip memory usage for one or more groups of layers. Circuit 100 can compare the total memory usage for each group of layers to the 500 MB on-chip storage capacity. Circuit 100 can then determine a partitioning or grouping of layers that form a sequence of superlayers based on the results of the comparison. Circuit 100 determines the partitioning of the layers into a sequence of superlayers so as to not exceed the threshold storage capacity of the on-chip memory (500 MB) when a hardware circuit processes a batch of neural network inputs for the working sets.

Figure 6A:
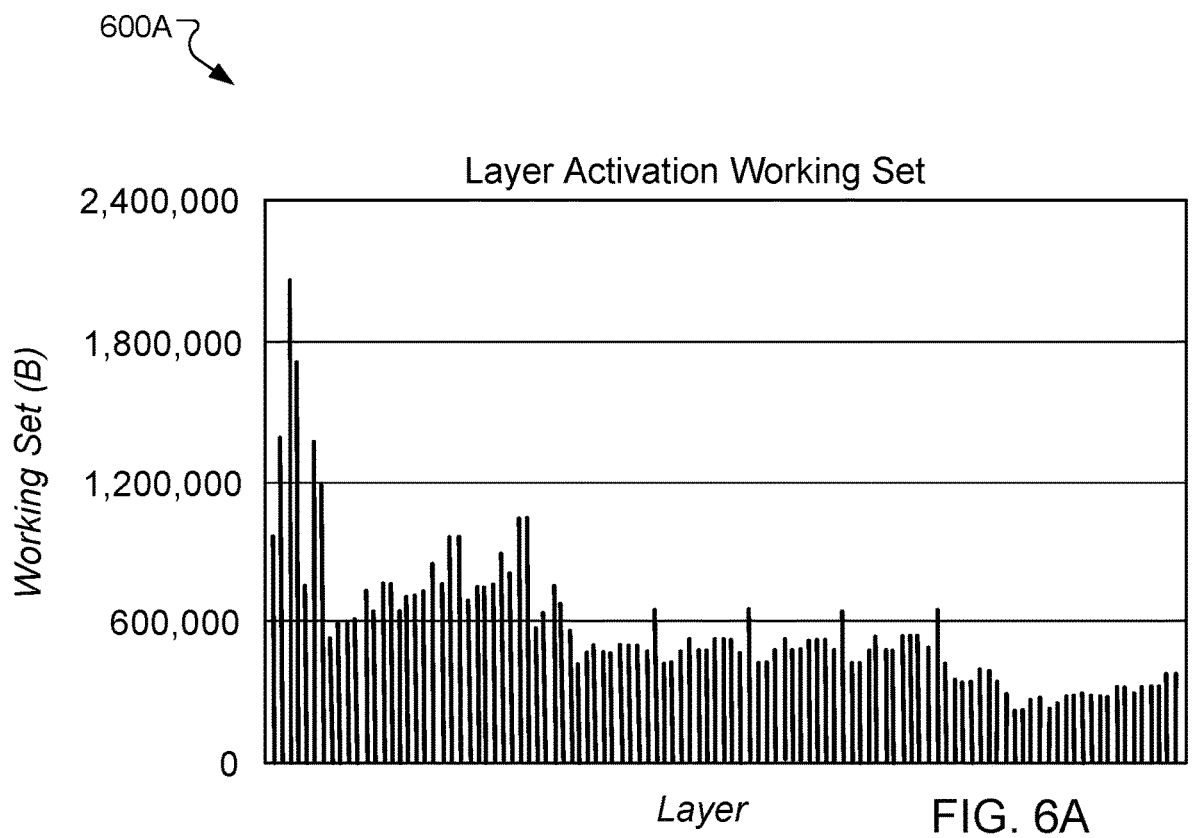
FIG. 6A illustrates an example graph that represents a working set size for a neural network layer.
Figure 6B:
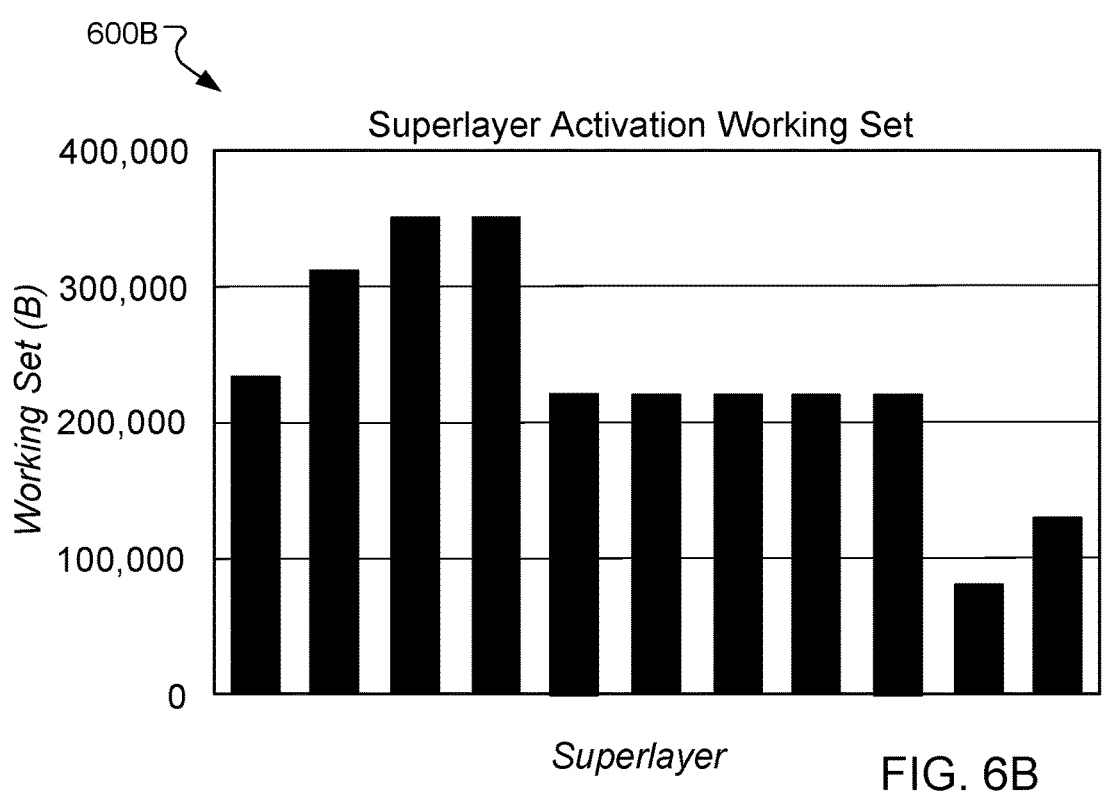
FIG. 6B illustrates an example graph that represents a working set size for a superlayer of a neural network.

FIG. 6A illustrates an example graph 600A that represents an activation working set size for a neural network layer, while FIG. 6B illustrates an example graph 600B that represents an activation working set size for a superlayer of a neural network. As discussed above, and as indicated by graphs 600A and 600B, working sets for neural network layers that are not arranged as superlayers can include substantially larger working set sizes when compared to a sizes of a working set for neural network layers arranged as superlayers.

For example, working sets for batch processing using the conventional scheduling policy described above can result in working set sizes that include millions of inputs. Such large quantities of inputs can exceed a storage or threshold capacity of on-chip memory resources of a hardware circuit when on-chip storage units 204 are used to store inputs and parameters used to processed the inputs. In contrast, working sets for batch processing using superlayer partitions, based on an improved scheduling policy as described herein, can result in working set sizes that include substantially fewer inputs. The substantially fewer quantities of inputs can be efficiently stored using on-chip storage units 204 such that the on-chip memory capacity is not exceeded.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus.

Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output(s). The processes and logic flows can also be performed by, and apparatus can also be implemented as, special purpose logic circuitry, e.g., an FPGA (field programmable gate array), an ASIC (application specific integrated circuit), a GPGPU (General purpose graphics processing unit), or some other processing unit.

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for processing a batch of neural network inputs using a neural network implemented on a hardware integrated circuit, the neural network comprising a plurality of neural network layers arranged in a directed graph, the method comprising:
receiving the batch of neural network inputs;
identifying layers of the neural network that are partitioned into a sequence comprising a plurality of superlayers, wherein each superlayer comprises two or more neural network layers and is a partition of the directed graph; and
processing the batch of neural network inputs using the integrated circuit, comprising: for each superlayer of the plurality of superlayers:
obtaining a respective superlayer input corresponding to each of the neural network inputs in the batch;
prior to processing a superlayer input using any of the neural network layers in the superlayer, loading, into a parameter memory of the integrated circuit, a respective set of parameters for each of the layers in the superlayer; and
processing the superlayer input through a neural network layer in the superlayer using the respective set of parameters for the neural network layer obtained from the parameter memory;
wherein each superlayer output provided as a superlayer input to a subsequent superlayer in the sequence is processed through a layer of the subsequent superlayer based on a global scheduling policy,
wherein the global scheduling policy determines when superlayer outputs generated by the superlayer at different process iterations are provided as superlayer inputs to the subsequent superlayer based on layer dimensions of a machine-learning model implemented on the integrated circuit.

2. The method of claim 1, further comprising:
generating a superlayer output based on the processing of the superlayer input through a neural network layer in the superlayer.

3. The method of claim 2, wherein the superlayer output is an output of a first superlayer in the sequence and the method further comprises:
receiving the superlayer output as a superlayer input to a neural network layer in a second superlayer in the sequence; and
for the superlayer input corresponding to the superlayer output of the first superlayer, processing that superlayer input through a neural network layer in the second superlayer in the sequence.

4. The method of claim 1, wherein loading the respective set of parameters for each of the neural network layers in the superlayer comprises:
pre-loading, into the parameter memory, the respective set of parameters based on data values received from a host that is external to the integrated circuit and the parameter memory.

5. The method of claim 4, wherein processing the batch of neural network inputs using the integrated circuit comprises:
processing the batch of neural network inputs based on the global scheduling policy that performs the global scheduling of neural network computations over batch and layer dimensions of a neural network model implemented at the integrated circuit.

6. The method of claim 5, wherein the global scheduling of the neural network computations is performed using the host.

7. The method of claim 1, wherein:
each neural network layer of a superlayer in the sequence is associated with a respective working set; and
the respective working set is defined in part by an amount memory required to store parameters for the neural network layer used to process superlayer inputs in the working set.

8. The method of claim 1, wherein:
a first superlayer in the sequence represents a first partition of the directed graph; and
a second superlayer in the sequence represents a second, different partition in the directed graph.

9. A system for processing a batch of neural network inputs using a neural network implemented on a hardware integrated circuit, the neural network comprising a plurality of neural network layers arranged in a directed graph, the system comprising:
the integrated circuit, a processor, and a non-transitory computer-readable storage device for storing instructions that are executable by the processor to cause performance of operations comprising:
receiving the batch of neural network inputs;
identifying layers of the neural network that are partitioned into a sequence comprising a plurality of superlayers, wherein each superlayer comprises two or more neural network layers and is a partition of the directed graph; and
processing the batch of neural network inputs using the integrated circuit, comprising: for each superlayer of the plurality of superlayers:
obtaining a respective superlayer input corresponding to each of the neural network inputs in the batch;

prior to processing a superlayer input using any of the neural network layers in the superlayer, loading, into a parameter memory of the integrated circuit, a respective set of parameters for each of the layers in the superlayer; and processing the superlayer input through a neural network layer in the superlayer using the respective set of parameters for the neural network layer obtained from the parameter memory;

wherein each superlayer output provided as a superlayer input to a subsequent superlayer in the sequence is processed through a layer of the subsequent superlayer based on a global scheduling policy, wherein the global scheduling policy determines when superlayer outputs generated by the superlayer at different process iterations are provided as superlayer inputs to the subsequent superlayer based on layer dimensions of a machine-learning model implemented on the integrated circuit.

10. The system of claim 9, wherein the operations comprise:

generating a superlayer output based on the processing of the superlayer input through a neural network layer in the superlayer.

11. The system of claim 10, wherein the superlayer output is an output of a first superlayer in the sequence and the operations further comprise:

receiving the superlayer output as a superlayer input to a neural network layer in a second superlayer in the sequence; and for the superlayer input corresponding to the superlayer output of the first superlayer, processing that superlayer input through a neural network layer in the second superlayer in the sequence.

12. The system of claim 9, wherein loading the respective set of parameters for each of the neural network layers in the superlayer comprises:

pre-loading, into the parameter memory, the respective set of parameters based on data values received from a host that is external to the integrated circuit and the parameter memory.

13. The system of claim 12, wherein processing the batch of neural network inputs using the integrated circuit comprises:

processing the batch of neural network inputs based on the global scheduling policy that performs the global scheduling of neural network computations over batch and layer dimensions of a neural network model implemented at the integrated circuit.

14. The system of claim 13, wherein the global scheduling of the neural network computations is performed using the host.

15. The system of claim 9, wherein:

each neural network layer of a superlayer in the sequence is associated with a respective working set; and the respective working set is defined in part by an amount memory required to store parameters for the neural network layer used to process superlayer inputs in the working set.

16. The system of claim 9, wherein:

a first superlayer in the sequence represents a first partition of the directed graph; and a second superlayer in the sequence represents a second, different partition in the directed graph.

17. A non-transitory computer-readable storage device configured to store instructions for processing a batch of neural network inputs using a neural network implemented on a hardware integrated circuit, the neural network comprising a plurality of neural network layers arranged in a directed graph and the instructions are executable by a processor to cause performance of operations comprising:

receiving the batch of neural network inputs;

identifying layers of the neural network that are partitioned into a sequence comprising a plurality of superlayers, wherein each superlayer comprises two or more neural network layers and is a partition of the directed graph; and processing the batch of neural network inputs using the integrated circuit, comprising: for each superlayer of the plurality of superlayers:

obtaining a respective superlayer input corresponding to each of the neural network inputs in the batch;

prior to processing a superlayer input using any of the neural network layers in the superlayer, loading, into a parameter memory of the integrated circuit, a respective set of parameters for each of the layers in the superlayer; and processing the superlayer input through a neural network layer in the superlayer using the respective set of parameters for the neural network layer obtained from the parameter memory;

wherein each superlayer output provided as a superlayer input to a subsequent superlayer in the sequence is processed through a layer of the subsequent superlayer based on a global scheduling policy, wherein the global scheduling policy determines when superlayer outputs generated by the superlayer at different process iterations are provided as superlayer inputs to the subsequent superlayer based on layer dimensions of a machine-learning model implemented on the integrated circuit.

18. The non-transitory computer-readable storage device of claim 17, wherein the operations further comprise:

generating a superlayer output based on the processing of the superlayer input through a neural network layer in the superlayer.

19. The non-transitory computer-readable storage device of claim 18, wherein the superlayer output is an output of a first superlayer in the sequence and the operations further comprise:

receiving the superlayer output as a superlayer input to a neural network layer in a second superlayer in the sequence; and for the superlayer input corresponding to the superlayer output of the first superlayer, processing that superlayer input through a neural network layer in the second superlayer in the sequence.

20. The non-transitory computer-readable storage device of claim 17, wherein loading the respective set of parameters for each of the neural network layers in the superlayer comprises:

pre-loading, into the parameter memory, the respective set of parameters based on data values received from a host that is external to the integrated circuit and the parameter memory.

* * * * *